United States Patent [19]

Mariella, Jr.

[11] 4,320,300
[45] Mar. 16, 1982

[54] ISOTOPE SEPARATION BY SOLAR PHOTOIONIZATION

[75] Inventor: Raymond P. Mariella, Jr., Madison, N.J.

[73] Assignee: Allied Chemical Corporation, Morris Township, Morris County, N.J.

[21] Appl. No.: 79,751

[22] Filed: Sep. 28, 1979

[51] Int. Cl.³ .......................... B01J 1/10; H01J 39/34
[52] U.S. Cl. .................................. 250/423 P; 250/284
[58] Field of Search ................... 250/423 P, 281, 282, 250/288, 284; 423/2

[56] References Cited

U.S. PATENT DOCUMENTS

| | | | |
|---|---|---|---|
| 3,521,054 | 7/1970 | Poschenriede et al. | 250/423 P |
| 3,740,552 | 6/1973 | Pressman | 250/423 P |
| 3,937,956 | 2/1976 | Lyon | 250/423 P |
| 4,023,038 | 5/1977 | James et al. | 250/423 P |
| 4,149,077 | 4/1979 | Yamashita et al. | 250/423 P |

*Primary Examiner*—Bruce C. Anderson
*Attorney, Agent, or Firm*—James Riesenfeld

[57] ABSTRACT

Isotope separation, particularly separation of isotopes of lithium, is achieved by exposing a beam of atoms to radiation that selectively excites atoms of a particular isotope without exciting atoms of other isotopes of that element. The excited atoms are ionized by solar radiation and the ions attracted to an ion collector plate maintained at a negative potential. The atoms not ionized are condensed on a grounded atom collector plate. Optionally, the solar radiation not absorbed by the system may be used to generate electricity. Lithium isotopes are useful in nuclear reactors and nuclear weapons.

19 Claims, 3 Drawing Figures

ISOTOPE SEPARATION BY SOLAR PHOTOIONIZATION

BACKGROUND OF THE INVENTION

1. Field of the Invention

This invention relates to separation of isotopes by solar photoionization and particularly to separation of $^6$Li and $^7$Li.

2. Description of the Prior Art

There are two naturally occurring isotopes of lithium—$^6$Li and $^7$Li. The natural abundance of the isotopes is 7% $^6$Li and 93% $^7$Li. Both isotopes find several uses in purified form. $^6$Li undergoes fission on exposure to thermal neutrons, producing tritium. Thus, it has applications in nuclear weapons and, potentially, in fusion reactors. $^7$Li, in the form of LiOH or $Li_2CO_3$, is used as a pH controller in nuclear reactors but has a much larger potential market as a heat exchanger fluid in nuclear reactors. High purity is necessary, because $^7$Li does not readily undergo fission upon exposure to thermal neutrons.

Laser methods for isotope separation are well known and have been described in both patents and the scientific literature. In recent years, several reviews of laser separation of isotopes have appeared (See e.g. Sov. J. Quant. Electron. 6, 129 (1976); 6, 259 (1976) and Scientific American 236, 2, 86 (1977)). In particular, laser-induced fractionation and separation of lithium isotopes have been described by Rothe et al. Chem. Phys. Lett. 53, 74 (1978); 56, 336 (1978). Their process involves sequential two-photon ionization of $Li_2$. Initial excitation and ionization are both produced by laser irradiation (from one or two argon ion lasers). U.S. Pat. No. 4,149,077, issued Apr. 10, 1979 to Yamashita et al., discloses substantially the same method for laser separation of lithium isotopes. If large-scale lithium isotope production were based on this process, a great deal of expensive electrical energy would be consumed.

There are several other known processes for separating lithium isotopes—diffusion, mass spectrometry and electrolysis with an amalgam. These methods are also energy intensive and the amalgam process has pollution problems as well. Thus, a lithium isotope separation process which requires less energy and/or uses a renewable energy source would be attractive, particularly if it posed minimal pollution problems.

SUMMARY OF THE INVENTION

In accordance with the present invention, a process is provided for separating a particular isotope of an element from a beam of atoms of the particular isotope and at least one other isotope of the element. The process comprises exposing the beam to electromagnetic radiation of a predetermined wavelength to selectively excite atoms of the particular isotope of the element to an excited electronic state without substantially exciting atoms of other isotopes of the element, exposing the beam to solar radiation to selectively ionize the excited atoms of the particular isotope without substantially ionizing atoms containing other isotopes of the element and separating ions of the particular isotope from the remainder of the beam.

The ions of the particular isotope may be drawn toward a negatively biased ion collector plate, while the other isotopes, depleted or entirely free of the particular isotope, continue undiverted and are condensed on an atom collector plate. The solar radiation that is not absorbed by the isotopes being separated may be converted to electrical energy by a conventional solar energy converter. Thus, the process requires minimal input of energy in nonrenewable form and may, in fact, generate more electricity than it uses. Moreover, the process is substantially pollution-free and generates no troublesome by-products.

The process of this invention is particularly suitable for separating isotopes of lithium, although it may be used for separating isotopes of other elements such as uranium.

DETAILED DESCRIPTION OF THE INVENTION

This invention concerns a process for separating isotopes of an element using photo-excitation. The initial excitation, which may be called "bound state excitation," preferentially excites atoms of a particular isotope without substantially exciting atoms of other isotopes of that element. A laser, such as a tunable dye laser, may provide this bound state excitation. Solar radiation then provides the energy for ionization of the excited atoms. The excited state is preferably within about 3 ev or less of the ionization level to permit efficient ionization with solar radiation. Likewise, the ionization potential of the atom is preferably greater than about 3 ev to prevent appreciable ionization of atoms from the ground state.

The separation of isotopes of lithium, the preferred aspect of this invention, is discussed hereinafter in detail.

Figure 1:
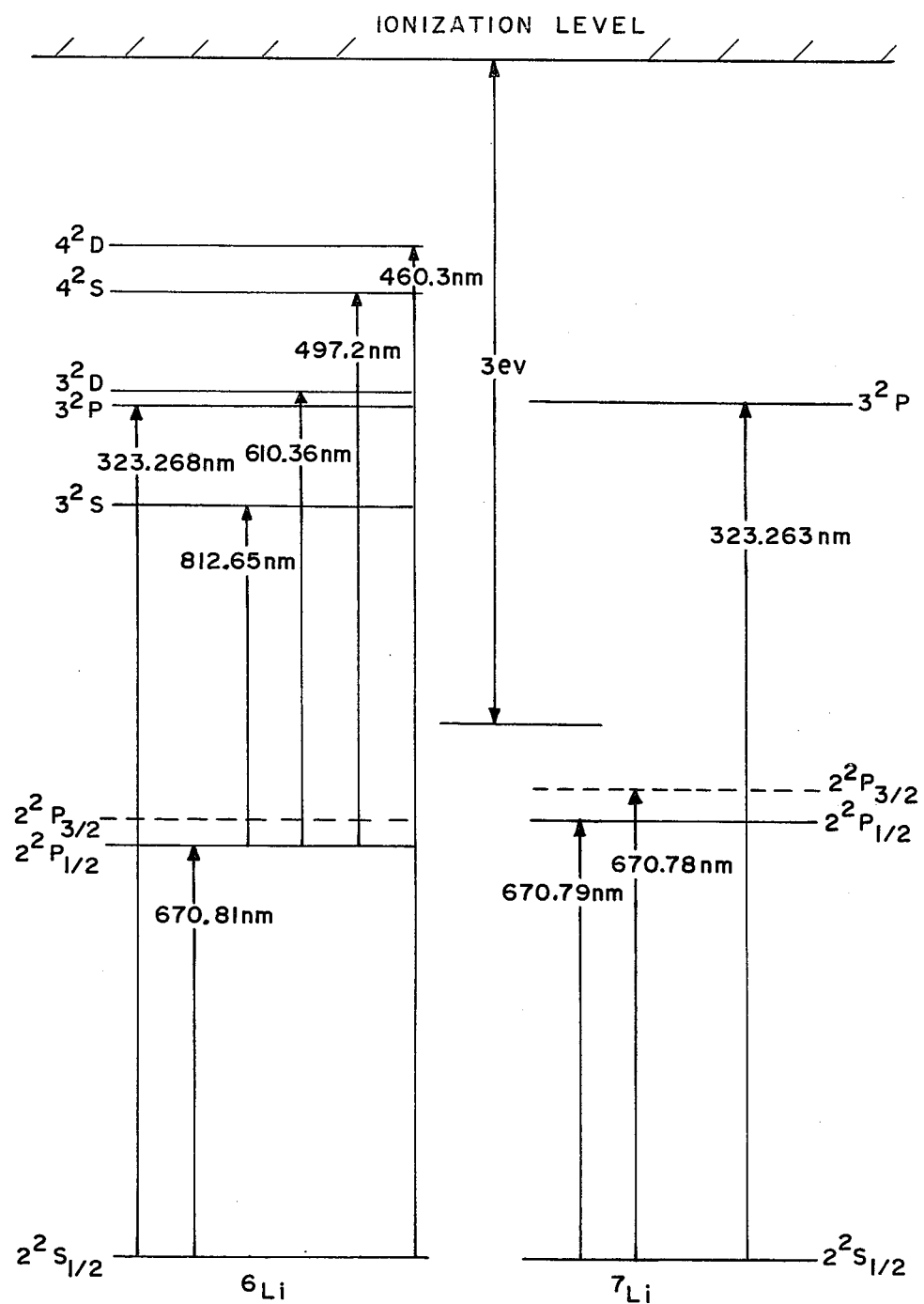
FIG. 1 shows certain energy levels of lithium that are significant in one embodiment of the present invention.

FIG. 1 shows the energy levels of $^6$Li and $^7$Li and transitions that are most important in the selective ionization of $^6$Li by the process of this invention. The separations of the levels of the $2^2P$ state are exaggerated for clarity. All the states with $n \geq 3$ are seen to lie within 3 ev of the ionization level.

Ionization of a lithium atom by the process of this invention is accomplished by two or more photoexcitation steps, including one or more bound state excitations followed by solar photoionization. The first bound state excitation must be isotope selective, discriminating between corresponding levels of $^6$Li and $^7$Li, which are typically about $5 \times 10^{-5}$ ev apart. If one or more additional bound state excitations are required, the excitation energy must correspond to the gap between levels to be effective and must not excite unwanted atoms from the ground state to avoid contamination of the desired isotope.

The most suitable two-step ionization method of this invention involves selectively exciting $^6$Li from the ground state to the $3^2P$ state by 323.268 nm radiation, then photoionizing the excited atoms with solar radiation.

A particularly suitable three-step ionization route to separating $^6$Li isotopes is carried out as follows:

(a) A beam of lithium atoms is exposed to monochromatic light of 670.81 nm to excite $^6$Li to the $2^2P_{\frac{1}{2}}$ state, while avoiding 670.78 nm and 670.79 nm light, which excites $^7$Li to the $2^2P_{\frac{1}{2}}$ and $2^2P_{3/2}$ levels, respectively, (b) $^6Li$ atoms are excited from $2^2P$ to $3^2D$ with 610.36 nm light and (c) $^6Li$ atoms are ionized from the $3^2D$ state with solar radiation.

Among the characteristics of lithium that make this three-step route particularly suitable are the large absorption cross-section for 670.81 nm light ($\sim 10^{-12}$ cm$^2$), high degeneracy of the excited states and large photoionization cross-section ($7 \times 10^{-18}$ cm$^2$) of the $3^2D$ state.)

Bound state excitation can be provided in at least three ways: lasers, the sun or a lithium vapor lamp. Laser bound state excitation is summarized in the Table, which lists suitable dyes and preferred pump lasers. When the first excitation is to $2^2P$, second excitation to $3^2S$ or $3^2D$ is preferred, because these transitions have higher cross-sections than the others.

TABLE

| Transition | Wavelength (nm) | Dye | Preferred Pump Laser |
|---|---|---|---|
| $2^2S$–$2^2P$ | 670.81 | Rhodamine 640 | Krypton ion |
| $2^2P$–$3^2D$ | 610.36 | Rhodamine 6G | Argon ion |
| $2^2P$–$3^2S$ | 812.65 | Oxazine | Krypton ion |
| $2^2P$–$4^2D$ | 460.3 | Coumarin or stilbene | Argon ion |
| $2^2P$–$4^2S$ | 497.2 | Coumarin 480 | Krypton ion |

At midday, the sun, under typical clear sky conditions, provides to a surface facing the sun about 6.5 mW/m$^2$ irradiance in a 0.0045 nm band centered at 670.81 nm. If this light is collected with 80% efficiency by a 4000 m$^2$ collector (e.g. by an array of heliostats), then the hourly yield of excited (to $2^2P$) $^6Li$ is 0.4 mole$\times$Q.Y., where Q.Y. is the quantum yield. Before photoionization is energetically possible, excitation from the $2^2P$ to a higher level is required. The most suitable wavelengths are listed in the Table and can likewise be provided by the sun.

A preferred source of bound state excitation is a Li vapor lamp, which emits precisely those wavelengths which are needed to excite $^6Li$ atoms. Of course, it also emits the wavelengths which excite $^7Li$ atoms. If the lamp contains the natural abundance of Li, 93% of the atoms are the heavier isotope, and consequently the emitted radiation will be richer in the (unwanted) wavelengths which excite $^7Li$ atoms. Even if the lamp contained pure $^6Li$, however, an unwanted wavelength would be emitted, since the energies of transition for $^6Li$ $2^2S_{\frac{1}{2}} \rightarrow 2^2P_{3/2}$ and $^7Li$ $2^2S_{\frac{1}{2}} \rightarrow 2^2P_{\frac{1}{2}}$ nearly coincide.

Except when the bound state excitation is monochromatic (i.e. from a laser), it is necessary to filter out radiation which excites $^7Li$ atoms. A preferred method for filtering uses a heat pipe containing $^7Li$ vapor and a quenching gas, preferably hydrogen, deuterium or a saturated hydrocarbon having vapor pressure of at least about 10 kPa at room temperature, such as methane, ethane, propane or butane. The Li$^7$ vapor strongly absorbs 670.78 nm and 670.79 nm radiation but passes 670.81 nm radiation, which excites $^6Li$ to the $2^2P$ state. In the heat pipe, before an excited $^7Li$ atom (in the $2^2P$ state) can absorb another photon, it yields its energy to the quenching gas and decays to the ground state. The wavelengths that excite $^7Li$ from the $2^2P$ state to higher states are nearly the same as those that excite $^6Li$ fom the $2^2P$ state; thus, it is important that these wavelengths not be absorbed by $^7Li$ atoms in the filter. D$_2$ or CH$_4$ in the range of about 10 kPa accomplishes the necessary quenching of excited $^7Li$. Reactivity of these gases with lithium is low, and quenching cross-sections are large.

As indicated above, various sources are suitable for providing the bound state excitation in the present process. However, efficient photoionization of the excited atoms is accomplished only by solar radiation. In order to ionize substantially all the $^6Li$ atoms in the atomic beam and leave pure $^7Li$, high solar radiation intensity ($\sim 1$ kW/cm$^2$ or, preferably, even higher) is required. With typical bound state excitation intensities ($\sim 3$ W/cm$^2$), about 60% of $^6Li$ atoms are in the $3^2D$ or $3^2S$ states. These states are most readily excited and solar photoionization is most efficient from them. At a temperature of about 400° C.–600° C., the Li atoms move at a velocity of about $1.7 \pm 0.2 \times 10^5$ cm/sec. If the solar radiation is concentrated in an area of about 100 cm linear dimension, the incident ionizing photon flux must be at least about 500 W/cm$^2$ in order to ensure that at least about 75% of the $^6Li$ atoms are ionized. The cross-section for ionizing atoms in the $3^2D$ or $3^2S$ states is about $7 \times 10^{-18}$ cm$^2$; thus, most of the incident solar photons are transmitted. The transmitted photons can be reflected back through the atomic beam to nearly double the effective photon flux. Alternatively, the transmitted photon can be made to fall on a solar energy converter and generate electricity.

The $^6Li$ atoms that are not ionized by the solar radiation are collected with and thereby contaminate the $^7Li$. But low photoionization intensity also causes $^7Li$ contamination of $^6Li$. The reason involves the near coincidence of the $^6Li$ $2^2P_{3/2}$ and $^7Li$ $2^2P_{\frac{1}{2}}$ levels. The heat pipe filtering of the bound state excitation prevents direct excitation of the $^7Li$ $2^2P_{\frac{1}{2}}$ level. However, this level can be indirectly excited by the following route, which may be called "radiation trapping":

(1) bound state excitation of $^6Li$ to $2^2P_{\frac{1}{2}}$, (2) further bound state excitation of $^6Li$ from $2^2P_{\frac{1}{2}}$ to $3^2D_{3/2}$, $3^2S_{\frac{1}{2}}$ or another higher-lying state, (3) emission from a higher-lying state to the $^6Li$ $2^2P_{3/2}$ level and (4) resonant transfer of energy from $^6Li$ $2^2P_{3/2}$ to $^7Li$ $2^2P_{\frac{1}{2}}$.

Radiation trapping can be reduced by decreasing lithium vapor density. Alternatively, if the photoionization rate is higher than the emission rate, radiation trapping is nearly eliminated, because the higher-lying $^6Li$ states are ionized before they emit.

In addition to contamination of $^6Li$ with $^7Li$ by radiation trapping, another source of this contamination is charge exchange. After a $^6Li$ positive ion is formed by the photoionization process, it is attracted to a negatively biased ion collector plate. To reach the plate it must move some distance through the rest of the atomic beam, most of which is $^7Li$. For lithium ions without about 50 to 100 V of translational energy, the cross-section for charge exchange is about $2 \times 10^{-14}$ cm$^2$. The cross-section decreases with increasing voltage; thus, higher voltage minimizes this effect, but it increases the energy expended per ion collected. At a beam density corresponding to about $10^{11}$/cm$^3$, charge exchange adds about 10% to 20% $^7Li$ contamination. Beam densities below about $10^{12}$/cm$^3$ are preferred, because higher beam densities yield higher contamination from both radiation trapping and charge exchange.

The above description has dealt only with the absorption of individual photons, but in the vicinity of strong transitions such as the 670.81 nm $2^2S \rightarrow 2^2P$ and 610.36 nm $2^2P \rightarrow 3^2D$, 2-photon "near-resonant" absorption can occur, if the combined energy of the 2 photons equals the total gap energy ($2^2S \rightarrow 3^2D$). By this effect, highly excited states (such as $3^2D$) are generated. The effect falls off as $1/(\nu - \nu_r)^2$, where $\nu_r$ is the frequency of the 670.81 nm) resonant transition. It slightly increases the rate of $^6Li$ excitation and also excites some $^7Li$, adding another 10% to 20% $^7Li$ contamination to the $^6Li$. Increasing the path length and pressure of $^7Li$ vapor in the heat pipe filter reduces the near-resonant light absorption by increasing pressure-broadened single-photon absorption. This slightly decreases the $^6Li$ excitation rate but, depending on the application, the increased $^6Li$ purity might offset this.

Similar apparatus and procedure can be used to selectively excite, ionize and collect $^7Li$. In that case, of course, the bound state excitation must provide the wavelength appropriate for exciting $^7Li$ and the filter must selectively remove wavelengths which excite $^6Li$. Thus, an appropriate heat pipe filter could contain $^6Li$ vapor and hydrogen, deuterium or a saturated hydrocarbon having vapor pressure of at least about 10 kPa at room temperature.

Figure 2:
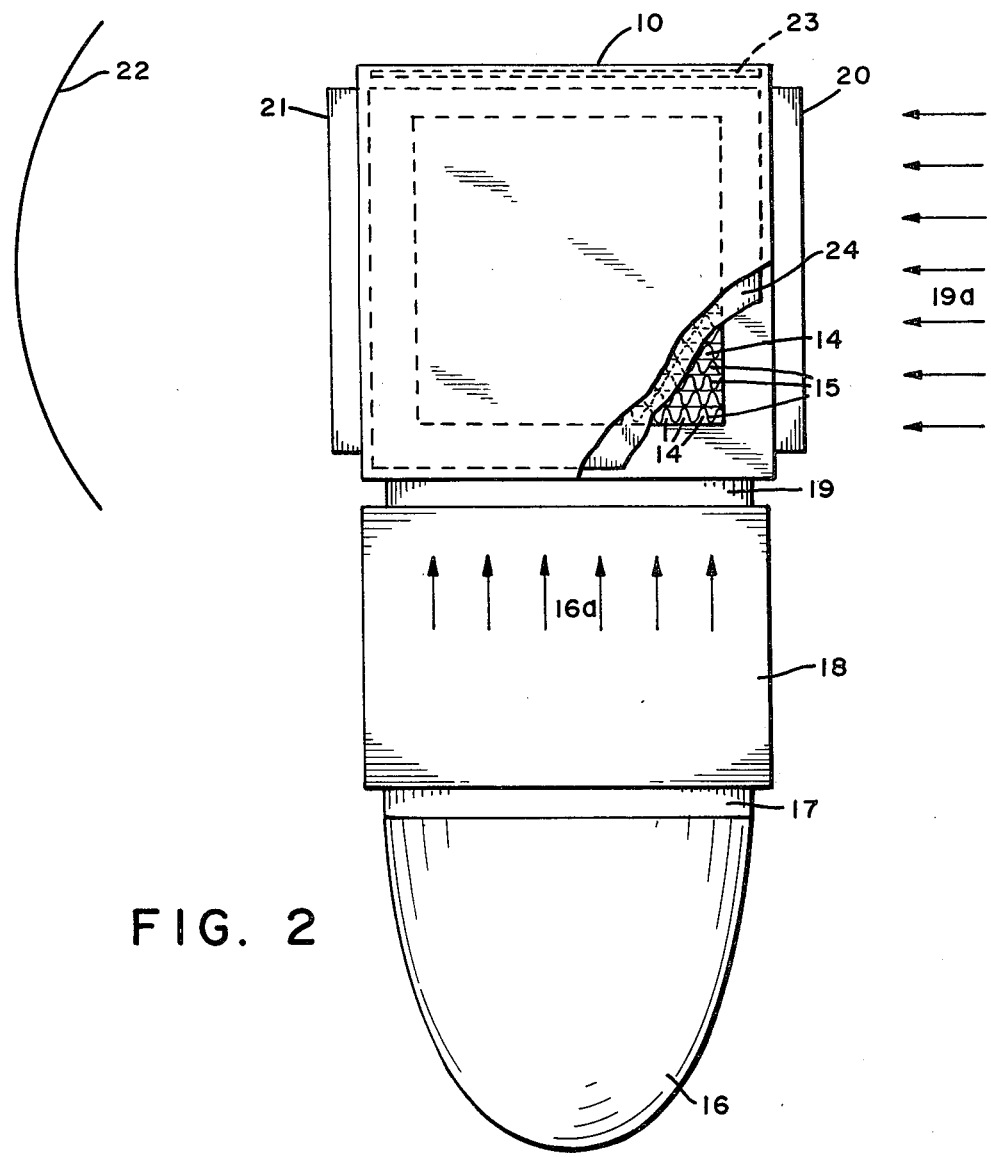
FIG. 2 is a top plan view in partial cutaway of an apparatus suitable for practicing this invention.
Figure 3:
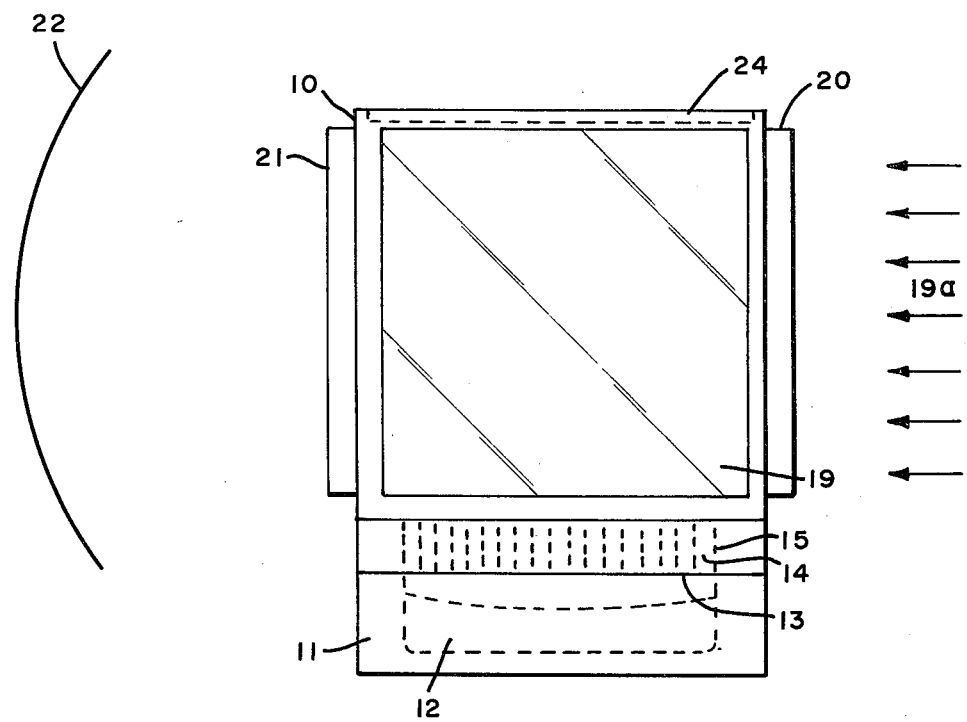
FIG. 3 is a side elevation of the apparatus of FIG. 2 with some parts removed for clarity.

Details of the present process can be understood by referring to FIGS. 2 and 3, which depict a typical apparatus suitable for separating lithium isotopes. Vacuum chamber 10, in which the pressure is maintained below about $10^{-2}$ Pa, includes oven 11 in its lower portion. Lithium metal 12 is vaporized in oven 11. The vapor emerges from opening 13 in the top and rises through channels 14 formed by corrugated metal foil 15. The foil serves to define and collimate the beam of lithium atoms. Ions formed in oven 11 are electrostatically trapped on the foil, but condensation of atoms from the beam is minimized by maintaining the foil at an elevated temperature with heaters (not shown). Lithium vapor lamp 16 or other suitable light source provides a beam of bound state excitation 16a, which passes through window 17 and is filtered by filter 18, unless source 16 is a laser, in which case filter 18 is not needed. After passing through window 19, beam 16a selectively excites atoms of one of the lithium isotopes. Filter 18 is preferably a heat pipe containing a quenching gas and a vapor of the Li isotope that is not to be ionized.

For clarity, lamp 16, window 17 and filter 18 are removed from FIG. 3. Solar radiation 19a from a concentrator (not shown) passes through window 20 and is incident on the atomic beam, ionizing excited atoms. Solar radiation not absorbed by the atomic beam passes through window 21, is reflected by mirror 22 and passes through the atomic beam a second time. Alternatively, mirror 22 could be oriented to direct the unabsorbed solar radiation to a solar energy converter (not shown). Windows 20 and 21 are heated by the solar radiation, thus minimizing condensation of lithium atoms on their surfaces. Window 19 is kept warm for the same reason. Solar radiation may provide both the bound state excitation and photoionization, in which case but a single (filtered) beam is needed. Ions are collected on ion collector plate 23, which is maintained at a negative potential. Neutral atoms are condensed on grounded atom collector plate 24, which is clamped to the top of chamber 10 for cooling purposes. Oven walls, corrugated oil and collector plates must all be of materials which don't react with lithium. Tungsten, tantalum, rhenium and molybdenum are examples of suitable materials. Molybdenum is preferred because of machinability and cost considerations.

The apparatus and procedure for separating uranium isotopes by the method of this invention are basically the same as that described above for separating lithium isotopes. Since uranium is a highly refractory metal, heating to the melting temperature is not convenient. Instead, an atomic beam of uranium atoms may be obtained by electron bombardment, as was described by Janes et al., IEEE J. Quant. Electron. QE-12, 111 (1976). Alternatively, the alloy $URe_2$, which melts at a much lower temperature, may be heated in an oven, as described by Carlson et al., J. Opt. Soc. Am. 66, 846 (1976).

Although the spectrum of atomic uranium is far more complex than that of lithium, appropriate levels for laser isotope separation have been determined (L. J. Radziemski, Jr., et al., Opt. Comm. 15, 273 (1975)). As with the lithium isotope separation, $^{235}U$ and $^{238}U$ may be separated by selectively exciting one of the isotopes to a state lying less than about 3 ev below the ionization level and then ionizing the excited atoms with solar radiation. For example, two-step ionization may be accomplished using bound state excitation of 343.55nm or 348.94 nm followed by solar photoionization. Alternatively, three-step ionization can use bound state excitations of 591.54 nm and 545.61 nm or 682.69 and 548.89 nm followed by solar photoionization. If necessary, filtering may be provided by a heat pipe containing a quenching gas, such as xenon, and the uranium isotopes that are not to be ionized. Ions of the desired iosotope are attracted to an ion collector plate maintained at a negative potential, while atoms of other isotopes are condensed on a grounded atom collector plate.

EXAMPLE

Natural isotopic abundance lithium metal is heated to about 400° C. in an oven within a vacuum chamber maintained at a pressure of $10^{-3}$ Pa. The lithium vapor pressure in the oven is about 10 Pa. Lithium atoms emerge from the top of the oven, rise through channels formed by corrugated molybdenum foil and are exposed to bound state excitation from two dye lasers pumped by an argon ion laser. Radiation of 670.81 nm (from rhodamine 640) and 610.36 nm (from rhodamine 6G) selectively excite $^6Li$ atoms to the $3^2D$ state. Solar radiation concentrated from a series of heliostats is focused on and ionizes the excited $^6Li$ atoms. The solar radiation not absorbed is directed to a thermal solar energy converter to generate electricity. For a lithium density of $10^{11}$ atoms/cm$^3$, about $1.5 \times 10^{17}$/sec ions of $^6Li$ are attracted to and condensed on an ion collector plate maintained at a negative potential of about 100 V. About $2 \times 10^{18}$/sec atoms of $^7Li$ are condensed on a grounded atom collector plate. Both collector plates are held at a temperature below about 180° C.

I claim:

1. A process for separating a particular isotope of an element from a beam of atoms of the particular isotope and at least one other isotope of the element which comprises:
    (a) exposing the beam to electromagnetic radiation of a predetermined wavelength to selectively excite atoms of the particular isotope of the element to an excited electronic state without substantially exciting atoms of other isotopes of the element,
    (b) exposing the beam to solar radiation to selectively ionize the excited atoms of the particular isotope without substantially ionizing atoms containing other isotopes of the element and (c) separating ions of the particular isotope from the remainder of the beam.

2. The process of claim 1 wherein the element comprises lithium.

3. The process of claim 1 wherein the element comprises uranium.

4. The process of claim 1 wherein the source of the predetermined wavelength is a laser.

5. The process of claim 1 further comprising between steps (a) and (b) exposing the beam to a second predetermined wavelength to excite to a higher electronic state excited atoms of the particular isotope without substantially exciting atoms of other isotopes of the element.

6. The process of claim 5 wherein the element comprises lithium.

7. The process of claim 5 wherein the element comprises uranium.

8. The process of claim 5 wherein the first and second predetermined wavelengths are produced by at least one laser.

9. The process of claim 5 wherein the first and second predetermined wavelengths are produced by filtering radiation from a source of polychromatic radiation.

10. The process of claim 9 wherein the source of polychromatic radiation is solar radiation.

11. The process of claim 9 wherein the particular isotope is $^6Li$ and the polychromatic radiation is filtered by passing through a medium comprising $^7Li$ vapor and a gas selected from the group consisting of hydrogen, deuterium and saturated hydrocarbons having vapor pressure of at least about 10 kPa at room temperature.

12. The process of claim 11 wherein the gas comprises deuterium.

13. The process of claim 11 wherein the gas comprises methane.

14. The process of claim 9 wherein the particular isotope is $^7Li$ and the polychromatic radiation is filtered by passing through a medium comprising $^6Li$ vapor and a gas selected from the group consisting of hydrogen, deuterium and saturated hydrocarbons having vapor pressure of at least about 10 kPa at room temperature.

15. The process of claim 14 wherein the gas comprises deuterium.

16. The process of claim 14 wherein the gas comprises methane.

17. The process of claim 11 or claim 14 wherein the source of polychromatic radiation is a lithium vapor lamp.

18. The process of claim 1 or claim 5 wherein the solar radiation incident on the beam has intensity of at least 500 $W/cm^2$.

19. The process of claim 1 or claim 5 further comprising the step of converting to electrical energy solar radiation not absorbed in the isotope separation process.

* * * * *